Inventor:
Karl Flury,
by Pierce, Scheffler & Parker,
Attorneys.

Inventor:
Karl Flury,
by Pierce, Scheffler & Parker,
Attorneys.

United States Patent Office 2,805,284

Patented Sept. 3, 1957

2,805,284

APPLIANCE INTENDED FOR USE WITH SUBSCRIBERS' TELEPHONE STATIONS TO REPRODUCE INCOMING CALLS IN A LOUDSPEAKER

Karl Flury, Adliswil, Switzerland, assignor to Defensor A. G., Zurich, Switzerland Application June 22, 1954, Serial No. 438,577

Claims priority, application Switzerland June 1, 1954

7 Claims. (Cl. 179—1)

Many appliances have been made known, which are intended for use with subscribers' telephone stations and make it possible to reproduce incoming calls in a loudspeaker. Such appliances include an amplifier to be coupled to the telephone receiver and enable as a rule the supporting of the microtelephone of the subscriber's station in such a way that the microphone may be voice-actuated at a certain distance. During the conversation the microtelephone need therefore no longer be held in the hand.

In all appliances of the type there is danger of acoustic reaction from the loudspeaker onto the microphone of the subscriber's station, which becomes apparent through howling or whistling. Hitherto attempts have been made to overcome this defect by interposing acoustic damping shields between loudspeaker and microtelephone or by spatially separating the loudspeaker from the support of the microtelephone so far as this appeared reasonable. The first measure had comparatively little effect, and the second is disadvantageous for reasons of greater space required and less favourable structure of the appliance. In addition, by experience, in either case only a relatively slight volume of sound reproduction is possible, because acoustic reaction will occur all the same. Also such reaction may be due either to conduction of sound in the mass of the appliance or in the furniture supporting same.

The present invention relates to an appliance intended for use with subscribers' telephone stations to reproduce incoming calls in a loudspeaker, to enable greater volume of sound reproduction than hitherto, before acoustic reaction takes place.

It has been noticed with appliances of the type heretofore that acoustic reaction always takes place at approximately the same audio frequency, i. e. at the resonant frequency of the telephone receiver of the subscriber's station having the appliance coupled thereto. It therefore makes no difference whether the amplifier of the appliance is coupled to the telephone receiver electromagnetically or galvanically. The present invention is based on recognition of this fact.

The appliance according to the invention is characterized by the provision of frequency-dependent means adapted to reduce the loudness of sound reproduction for a frequency band containing the resonant frequency of the telephone receiver to such an extent that with resonant hump of the telephone receiver no higher sound reproduction will occur than on reproduction of the remaining speech frequencies. As compared with the previous volume, the loudness of sound reproduction may thus be increased, without feedback occurring, by the same amount as the volume with resonant hump of the receiver was previously greater than in the remaining speech frequencies.

Also the loudness of sound reproduction at resonant frequency of the diaphragm of the microphone of the subscriber's station may be reduced in a similar way.

Moreover, the means and measures applied so far for reducing acoustic reaction may be maintained.

Further features of the invention will appear from the following specification with appended claims and accompanying drawing, the latter representing by way of example two forms of embodiment incorporating the invention.

Figure 1:
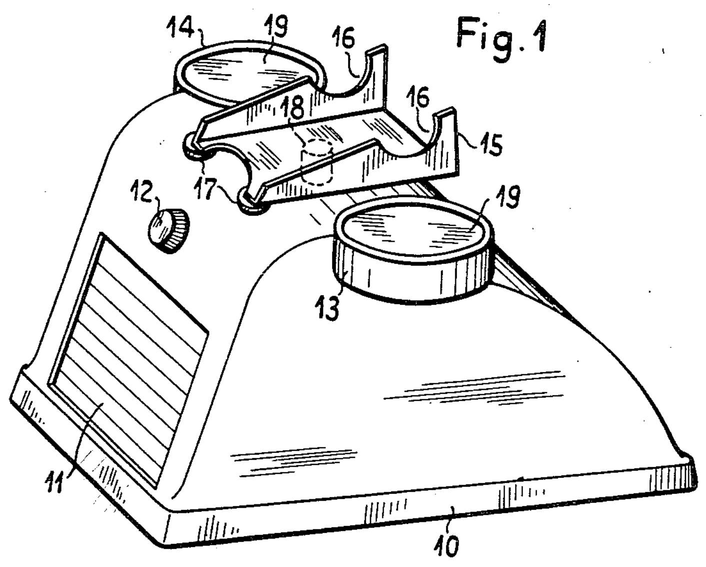
Fig. 1 is a diagrammatic representation of an appliance according to the invention, without the microtelephone of a subscriber's apparatus.
Figure 3:
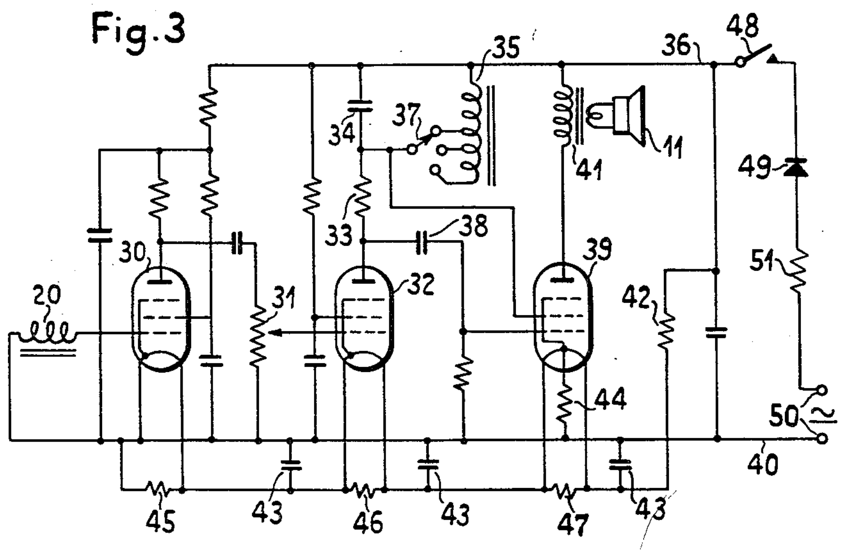
Fig. 3 is a first example of a wiring diagram for the amplifier with directly heated tubes.
Figure 4:
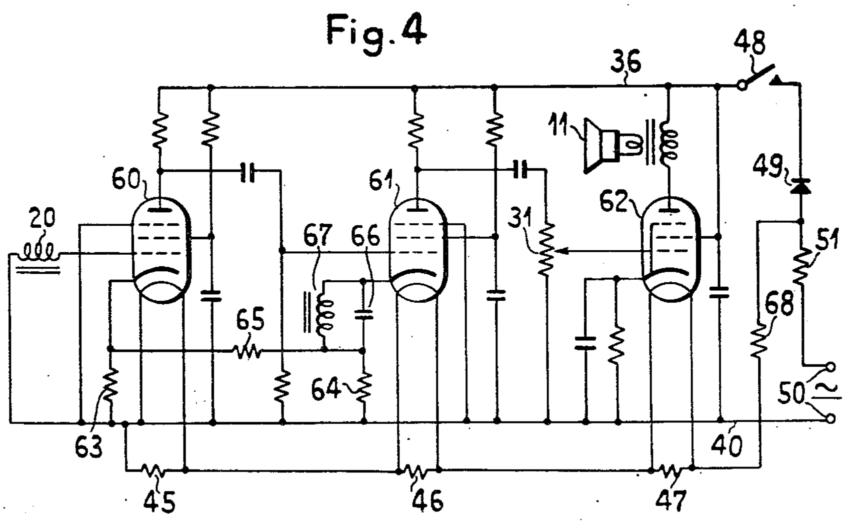
Fig. 4 is a second example of a wiring diagram for the amplifier with indirectly heated tubes.

The appliance as illustrated in Fig. 1 comprises a casing 10 incorporating an amplifier according to Fig. 3 or 4 with its loudspeaker 11. A knob 12 serves to adjust the volume of reproduction. Mounted on casing 10 are two box-shaped pads 13 and 14 onto which the microtelephone of a subscriber's station can be placed in such a way that the receiver comes to lie over the pad 13 and the microphone over the pad 14. To secure the microtelephone in a position, in which the microphone stands approximately upright, the casing 10 is provided with a cradle 15 in the recesses 16 of which the handle of the microtelephone can be placed. The cradle 15 is rockably supported by joints 17 on casing 10 in such a way that its rear portion will be depressed by the weight of a microtelephone placed thereon. The cradle 15 is moreover supported by a spring-urged press-button 18 displaceably arranged in substantially vertical direction and having the tendency to push the cradle 15 upwards as shown in Fig. 1. The faces of the box-shaped projections 13 and 14 are formed by resilient pads 19 which preferably consist of foamed rubber plates.

Figure 2:
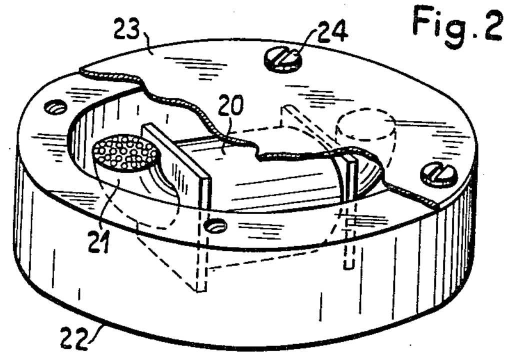
Fig. 2 is a diagrammatic view of a device adapted for magnetically coupling the amplifier of the appliance to the telephone receiver, with shielding foil shown partially broken away.

The box 13 accommodates the device as shown in Fig. 2, which includes an electric coil 20 protruded by a bail-shaped iron core 21 with upwardly projecting extremities. The coil 20 together with its iron core 21 are located within a thick-walled pot 22 of magnetically non-conducting metal, say, aluminium, copper or the like. The opening of the pot 22 is covered by a much thinner foil 23 of similar material. The foil 23 is secured to the pot by several screws 24. The ends of the core 21 are immediately under the foil 23. The pot 22 serves both for electrostatic as well as for magnetic shielding of coil 20 and core 21, the latter by eddy current induction. The thick bottom and side wall of pot 22 shields magnetically in every direction except in the upward direction. The foil 23 constituting the top wall of the completely walled in housing for coil 20 and core 21 in turn merely serves for electrostatic shielding and allows magnetic lines of force to pass therethrough practically unweakened. Immediately overlying the foil 23 is a pad plate 19. When during a telephone conversation the microtelephone is placed on the boxes 13 and 14, the telephone receiver will produce a magnetic field varying at the rate of the voice frequencies of the incoming call, said magnetic field passing through the core 21 and coil 20 and causes induction potentials to set up in the latter.

According to Fig. 3, the coil 20 is put in the control grid circuit of the first tube 30 of an amplifier and thus serves as coupling coil to connect the amplifier with the telephone receiver. The first stage of the amplifier is connected in the usual way. The amplified audio frequency potential may be tapped on potentiometer 31 which is adjustable by knob 12. From the potentiometer 31 the potential reaches the control grid of a second tube 32, in the anode circuit of which there are series-connected a resistance 33 and an oscillatory circuit formed of a condenser 34 and an induction coil 35. The resistance 33 is thereby connected with the anode of tube 32, and the resonant circuit 34, 35 with the positive feed line 36 of the amplifier. The coil 35 has several taps. By means of a change-over switch 37 selectively a greater or smaller number of turns of the coil may be inserted in the resonant circuit so that the resonant frequency of the latter may be varied. The resonant circuit 34, 35 is tuned as exactly as possible to the resonant frequency of the telephone receiver of the subscriber's station to be suppressed, which frequency as a rule lies between 1500 and 1600 cycles. From the anode of tube 32 the amplified audio frequency potential reaches the control grid of an output tube 39 via coupling condenser 38. The feed potential for its screen grid is tapped between resistance 33 and resonant circuit 34, 35 and this screen grid will not be decoupled through a condenser toward the negative conductor 40 of the feed circuit as is usually the case. Included in the anode circuit of the output tube is a transformer 41 having the loudspeaker 11 joined to it.

All three tubes 30, 32 and 39 are directly heated. Their filaments are all connected in series, being on the one hand joined to the negative conductor 40 of the anode feed circuit and on the other hand to the positive conductor 36 of this anode feed circuit via series-resistance 42. For decoupling, the junctions between the filaments of the tubes 30 and 32 or 32 and 39 are connected with condensers 43 being in turn joined to the negative conductor 40. The filament of the final tube 39 has a mid tap which is connected to the negative conductor 40 via a resistance 44. The cathode alternating current is derived over said resistance 44, thus preventing same from flowing through the filaments of the two other tubes, which could give rise to unpleasent couplings. Connected in parallel to each tube is a protective resistance 45, 46 and 47 respectively of such a value that on burning out of a filament the potential at the condensers 43 will not rise appreciably.

Through a switch 48 the positive conductor 36 is connected to a rectifier 49. A plug 50 for connection to an A. C. or D. C. distribution system is connected on the one hand directly with the negative conductor 40 and on the other hand with the rectifier 49 via a series-resistance 51. The latter is wound inductionfree to prevent its producing an A. C. stray field liable to act upon coil 29. For the same reason a power supply transformer is avoided, and the heating circuit of the tubes is connected to the circuit 36, 40 which also serves for feeding the anodes. The switch 48 is operatively connected with the aforementioned press-button 18 so that when placing the microtelephone on the cradle 15 the switch 48 will be closed, and reopened automatically on lifting the microtelephone from the cradle 15.

The action of the aforedescribed appliance is as follows: With the microtelephone placed on cradle 15 and boxes 13 and 14, the input of the amplifier according to Fig. 2 is coupled via coil 29 to the telephone receiver, and the amplifier will be switched on. The voice frequencies of an incoming call will very audibly be reproduced in the loudspeaker 11. But the resonant frequency of the telephone receiver undergoes a much lower amplification than the remaining frequencies, since via screen-grid of the output tube, for the resonant frequency of the resonant circuit 34, 35 there arises a negative feedback onto the grid of the output tube via resistance 33 and condenser 38. Incidentally, in the vicinity of the resonant frequency the screen-grid of the output tube will no longer be decoupled, whereby the amplification factor will decrease until it approaches the value of a triode. In spite of the greater amplitude of the input signal of the amplifier with resonant hump of the receiver, reproduction in the loudspeaker will not be greater, or it may be even smaller than in the other voice frequencies below and above the resonant frequency. An acoustic reaction from the loudspeaker onto the microphone of the subscriber's station will thus largely be avoided, and it is possible to increase amplification of the voice frequencies lying outside the resonant frequency.

A further merit of the aforedescribed amplifier is seen in that the tubes, on closure of the switch 48, are each time ready to function but are not heated so long as no microtelephone is placed on the appliance.

Practice has shown that the resonant frequency is almost the same in all commercial telephone receivers. Taps on coil 35 may therefore also be dispensed with.

In the example of embodiment according to Fig. 4, the amplifier includes indirectly heated tubes 60, 61 and 62, but whose filament heaters are also series-connected and have resistances 45, 46 and 47 connected in parallel thereto. In the cathode circuit of the first tube 60 there is a resistance 63 without a condenser being connected in parallel to it as is usually the case. Similarly there is also a resistance 64 in the cathode circuit of the second tube 61. These two resistances generate each per se a negative feedback within the related amplifier stage. To compensate partly or wholly for the thus resulting reduction in amplification, the cathode-sided ends of the cathode resistances 63 and 64 have joined to them a coupling resistance 65 which generates a positive feedback being however kept so low that sustained oscillation of the amplifier cannot build up. Inserted between the cathode of the second tube 61 and the allocated cathode resistance 64 and the coupling resistance 65 there is a resonant circuit comprising a condenser 66 and an induction coil 67. This resonant circuit is tuned to the resonant frequency of the telephone receiver of the subscriber's station. Also in this case the coil 67 could be capable of being changed over as in the first example to suit different resonant frequencies of the telephone receiver.

For the rest the amplifier is designed in the usual way. The potentiometer 31, adjustable by means of a knob 12, is arranged between the second stage and the final stage of the amplifier. The current circuit for feeding the anodes of the amplifier tubes is of identical design as described with reference to Fig. 3. It may be broken by means of a switch 48. The heating circuit of the tubes 60, 61, 62 is on the one hand directly connected with the negative conductor 40 and one contact pin of the plug 50, and on the other hand with the series-resistance 51 via series-resistance 68. Also resistance 68 is wound inductionfree. Since these are indirectly heated tubes requiring a longer heating up time, the heating is constantly "on." Switch 48 only causes the break of the anode feed circuit.

The action of the last-described amplifier is as follows: With the exception of a band in the vicinity of the resonant frequency of the resonant circuit 66, 67 the voice frequencies are uniformly amplified. At resonant frequency, however, the second tube 61 undergoes a greater negative feedback, because of the appreciably increasing impedance in the cathode circuit. As a result the amplification of the second stage decreases. Further, also the positive feedback for the resonant frequency will diminish through resistance 65, since the feedback potential is tapped on a potential divider 64, 66, 67 whose dividing ratio is entirely changed at the resonant frequency thereof. The diminishing of the positive feedback results in a further decrease of the total amplification. In a comparatively narrow band which contains the resonant frequency of the resonant circuit 66, 67 and telephone receiver, the amplification is consequently appreciably reduced as compared with the remaining voice frequencies so that total amplification can be enhanced without an acoustic reaction from the loudspeaker 11 onto the microphone of the subscriber's station being generated.

In an entirely similar way also the amplification for the resonant frequency of the microphone of the subscriber's station could additively be reduced. The resonant circuits employed therefor could be put in series with the described resonant circuits 34, 35 and 66, 67 respectively.

Alternatively, the loudspeaker 11 could be housed in a separate casing located at some distance from casing 10 with the pads 13 and 14 for the microtelephone to ensure a lessening of acoustic reaction between loudspeaker and microphone of the subscriber's station. Said pads also contribute to a reduction of the reaction which in certain cases could be caused by sound conduction in the mass of the appliance.

What I claim is:

1. Appliance intended for use with subscribers' telephone stations, comprising a casing, means to removably support the telephone hand set consisting of a microphone and receiver on the casing, an amplifier incorporated in the casing, means to couple the telephone receiver circuit to the input of said amplifier, a loudspeaker arranged in said casing and connected with the output of said amplifier, and resonant means in the amplifier circuit adapted to reduce the volume of sound reproduction by said loudspeaker for a comparatively narrow frequency band lying within the transmitted speech frequency range and containing the resonant frequency of said receiver so that at the resonant hump of said receiver there will be no greater volume of sound reproduction than in reproducing the remaining speech frequencies below and above the resonant frequency of said receiver.

2. Appliance as claimed in claim 1, wherein said amplifier comprises at least two amplification stages with corresponding electronic tubes, the first of said tubes having a plate load impedance formed by a series-connection of a resistance and a resonant circuit tuned to the resonant frequency to be suppressed, said resistance being connected with the plate of the tube and the resonant circuit being connected with the current supply circuit, and said second tube having a screen-grid connected to a tap between said resistance and said resonant circuit.

3. Appliance as claimed in claim 2, wherein said resonant circuit is provided with means for tuning the same to various resonant frequencies to suit different telephone receivers.

4. Appliance as claimed in claim 1, wherein said amplifier comprises at least two amplification stages with corresponding indirectly heated electronic tubes, each of which in its cathode circuit is provided with a negative feedback generating resistance, the cathode-side ends of said resistances being interconnected by a coupling resistance to generate a positive feedback to compensate at least in part for the negative feedback, and a resonant circuit tuned to the resonant frequency to be suppressed being incorporated in the amplifier in such a manner as to reduce at the same time the amplification and the positive feedback at the resonant frequency of the resonant circuit.

5. Appliance as claimed in claim 4, wherein the resonant circuit is interconnected between the cathode of one tube and the related cathode resistance and said coupling resistance.

6. Appliance as claimed in claim 1 wherein a magnetically acting coil serves as said means for coupling the telephone receiver with the amplifier input, said coil being housed in a thick-walled pot of magnetically nonconducting, but electrically well conducting metal for magnetic and electrostatic screening of the coil, the top of said pot being covered by a much thinner foil of like metal for electrostatic screening only and allowing magnetic field lines to pass therethrough practically unweakened.

7. Appliance as claimed in claim 1, wherein said resonant means are adapted to reduce in a similar way the volume of sound reproduction for a comparatively narrow frequency band containing the resonant frequency of the microphone of the subscriber's station.

References Cited in the file of this patent

UNITED STATES PATENTS

| | | |
|---|---|---|
| 2,402,341 | Patterson | June 18, 1946 |
| 2,501,955 | McWane | Mar. 28, 1950 |